(12) United States Patent
Murao

(10) Patent No.: US 10,380,432 B2
(45) Date of Patent: Aug. 13, 2019

(54) ON-BOARD CAMERA APPARATUS

(71) Applicant: DENSO CORPORATION, Kariya, Aichi-pref. (JP)

(72) Inventor: Toshikazu Murao, Kariya (JP)

(73) Assignee: DENSO CORPORATION, Kariya, Aichi-pref. (JP)

( * ) Notice: Subject to any disclaimer, the term of this patent is extended or adjusted under 35 U.S.C. 154(b) by 111 days.

(21) Appl. No.: 15/159,304

(22) Filed: May 19, 2016

(65) Prior Publication Data

US 2016/0344977 A1 Nov. 24, 2016

(30) Foreign Application Priority Data

May 21, 2015 (JP) .................................. 2015-103572

(51) Int. Cl.
*H04N 5/225* (2006.01)
*G06K 9/00* (2006.01)
(Continued)

(52) U.S. Cl.
CPC .......... *G06K 9/00791* (2013.01); *B60R 11/04* (2013.01); *G06K 9/209* (2013.01); *H04N 5/2252* (2013.01); *H04N 5/2351* (2013.01); *H04N 5/2355* (2013.01); *H04N 5/23245* (2013.01); *B60R 2011/0026* (2013.01)

(58) Field of Classification Search
CPC . B60R 11/04; B60R 2011/0026; H04N 5/235; H04N 5/2355; H04N 5/2351; H04N 5/2353; H04N 5/243; H04N 5/2252; H04N 5/23245; G06K 9/00825; G06K 9/00791;
(Continued)

(56) References Cited

U.S. PATENT DOCUMENTS 5,710,594 A * 1/1998 Kim ....................... H04N 5/202
348/254
6,320,176 B1 * 11/2001 Schofield ............... B60N 2/002
250/208.1
(Continued)

FOREIGN PATENT DOCUMENTS

EP 3214600 A1 * 9/2017
JP 2006-325135 11/2006
(Continued)

*Primary Examiner* — David E Harvey
(74) *Attorney, Agent, or Firm* — Knobbe, Martens, Olson & Bear, LLP

(57) ABSTRACT

An on-board camera apparatus includes a camera module, a control circuit board, a housing, a bracket, and a hood. The housing houses the camera module and the control circuit board. The bracket fixes the housing to a front windshield of the own vehicle. The hood is arranged so as to cover the camera module. The camera module captures an image of an area ahead of an own vehicle. As captured images, the camera module generates a plurality of linear images in which a relationship between luminance and an output pixel value is fixed. Based on the linear images, the camera module further generates high dynamic range images in which a relationship between luminance and an output pixel value differs depending on a luminance region, under a predetermined imaging mode. The control circuit board enables a plurality of types of driving-related processes based on the captured images to be performed.

11 Claims, 7 Drawing Sheets

(51) Int. Cl.
*H04N 5/235* (2006.01)
*H04N 5/232* (2006.01)
*B60R 11/04* (2006.01)
*G06K 9/20* (2006.01)
*B60R 11/00* (2006.01)

(58) Field of Classification Search
CPC . G06K 9/00798; G06K 9/00805; G06K 9/209
See application file for complete search history.

(56) References Cited

U.S. PATENT DOCUMENTS

| | | | | |
|---|---|---|---|---|
| 8,154,618 B2* | 4/2012 | Makino | | G06T 5/009 |
| | | | | 348/223.1 |
| 8,993,951 B2* | 3/2015 | Schofield | | G05D 1/0244 |
| | | | | 250/208.1 |
| 9,160,936 B1* | 10/2015 | Rivard | | H04N 5/2355 |
| 9,584,710 B2* | 2/2017 | Marman | | G08B 13/19652 |
| 9,596,387 B2* | 3/2017 | Achenbach | | H04N 5/2251 |
| 2004/0143380 A1* | 7/2004 | Stam | | B60Q 1/085 |
| | | | | 701/36 |
| 2005/0275747 A1* | 12/2005 | Nayar | | H04N 5/2351 |
| | | | | 348/362 |
| 2006/0215882 A1* | 9/2006 | Ando | | G06K 9/00791 |
| | | | | 382/106 |
| 2007/0221822 A1* | 9/2007 | Stein | | B60Q 1/143 |
| | | | | 250/205 |
| 2008/0084165 A1* | 4/2008 | Otsuka | | B60Q 1/0023 |
| | | | | 315/82 |
| 2008/0095408 A1* | 4/2008 | Yokohata | | H04N 5/144 |
| | | | | 382/106 |
| 2009/0015683 A1* | 1/2009 | Ando | | B60R 1/00 |
| | | | | 348/222.1 |
| 2009/0046947 A1* | 2/2009 | Kobayashi | | G06T 5/50 |
| | | | | 382/284 |
| 2009/0051794 A1* | 2/2009 | Ando | | G06T 5/009 |
| | | | | 348/274 |
| 2009/0066819 A1* | 3/2009 | Ando | | G06T 5/009 |
| | | | | 348/254 |
| 2009/0073292 A1* | 3/2009 | Castorina | | H04N 5/2353 |
| | | | | 348/294 |
| 2009/0147116 A1* | 6/2009 | Koyama | | B60R 1/00 |
| | | | | 348/294 |
| 2009/0174808 A1* | 7/2009 | Mochida | | G03B 7/28 |
| | | | | 348/362 |
| 2009/0251563 A1* | 10/2009 | Mochida | | G03B 7/08 |
| | | | | 348/229.1 |
| 2011/0211732 A1* | 9/2011 | Rapaport | | G06F 3/1454 |
| | | | | 382/107 |
| 2011/0249143 A1* | 10/2011 | Tatsumi | | H04N 5/2355 |
| | | | | 348/229.1 |
| 2011/0254976 A1* | 10/2011 | Garten | | G06F 3/1454 |
| | | | | 348/229.1 |
| 2012/0002082 A1 | 1/2012 | Johnson et al. | | |
| 2012/0002898 A1 | 1/2012 | Cote et al. | | |
| 2012/0002899 A1 | 1/2012 | Orr, IV et al. | | |
| 2012/0034857 A1* | 2/2012 | Blake, III | | B60H 1/00785 |
| | | | | 454/75 |
| 2012/0050074 A1* | 3/2012 | Bechtel | | B60R 1/04 |
| | | | | 340/988 |
| 2012/0218442 A1* | 8/2012 | Jandhyala | | G06T 5/50 |
| | | | | 348/239 |
| 2013/0018547 A1* | 1/2013 | Ogata | | G06K 9/00825 |
| | | | | 701/36 |
| 2013/0076947 A1* | 3/2013 | Hirakawa | | H04N 9/04 |
| | | | | 348/273 |
| 2013/0084005 A1* | 4/2013 | Min | | H04N 1/4074 |
| | | | | 382/168 |
| 2013/0229521 A1* | 9/2013 | Siecke | | G06K 9/00825 |
| | | | | 348/148 |
| 2013/0235232 A1* | 9/2013 | Yang | | H04N 5/2353 |
| | | | | 348/229.1 |
| 2014/0063294 A1* | 3/2014 | Tatsuzawa | | H04N 5/265 |
| | | | | 348/239 |
| 2014/0160284 A1 | 6/2014 | Achenbach et al. | | |
| 2014/0211013 A1* | 7/2014 | Drummond | | B60R 1/088 |
| | | | | 348/148 |
| 2015/0042804 A1* | 2/2015 | Okuda | | B60R 11/04 |
| | | | | 348/148 |
| 2015/0062382 A1 | 3/2015 | Cote et al. | | |
| 2015/0086079 A1 | 3/2015 | Murao et al. | | |
| 2015/0117715 A1* | 4/2015 | Murao | | G06K 9/00825 |
| | | | | 382/104 |
| 2015/0124150 A1* | 5/2015 | Hibino | | B60R 11/04 |
| | | | | 348/335 |
| 2015/0256729 A1 | 9/2015 | Wato | | |
| 2015/0264230 A1* | 9/2015 | Takeda | | H04N 5/2252 |
| | | | | 348/95 |
| 2015/0271382 A1* | 9/2015 | Sekine | | H04N 5/2353 |
| | | | | 348/229.1 |
| 2016/0105679 A1* | 4/2016 | Murao | | G06T 5/009 |
| | | | | 348/169 |
| 2016/0119509 A1* | 4/2016 | Wato | | H04N 5/2251 |
| | | | | 348/148 |
| 2016/0216595 A1* | 7/2016 | Carlson | | G03B 17/561 |

FOREIGN PATENT DOCUMENTS

| | | |
|---|---|---|
| JP | 2007-311895 | 11/2007 |
| JP | 2009-239398 A | 10/2009 |
| JP | 2012-075059 | 4/2012 |
| WO | WO 2013/019795 A1 * | 2/2013 |
| WO | WO 2013/123161 A1 * | 8/2013 |

\* cited by examiner

ON-BOARD CAMERA APPARATUS

CROSS-REFERENCE TO RELATED APPLICATION

This application is based on and claims the benefit of priority from Japanese Patent Application No. 2015-103572, filed May 21, 2015. The entire disclosure of the above application is incorporated herein by reference.

BACKGROUND

Technical Field

The present disclosure relates to an on-board camera apparatus.

Related Art

A technique is known in which a grey scale conversion process is performed on a linear image (i.e., an image in which a relationship between an output pixel value and luminance is fixed for all luminance regions) that has been obtained through imaging. A non-linear image in which the brightness of a subject is optimized is thereby obtained (refer to JP-A-2007-311895). As a result of a captured image used in a process performed by an on-board apparatus being converted to such a non-linear image, it is thought that the brightness of a recognition target can be optimized and accuracy of the process can be improved.

However, depending on the content of the above-described process performed by the on-board apparatus, the surrounding environment, and the like, a situation in which use of the linear image is preferable to use of the non-linear image is possible. In this case, a delay in image generation may occur when switching is performed between a mode in which the linear image is generated and a mode in which the non-linear image is generated. As a result, real-timeness of the process may be impaired

SUMMARY

It is thus desired to enable a process to be performed with high accuracy and in real-time, based on a captured image of an area ahead of an own vehicle.

An exemplary embodiment of the present disclosure provides a an on-board camera apparatus that includes: a camera module that captures an image of an area ahead of an own vehicle, generates a plurality of linear images in which a relationship between luminance and an output pixel value is fixed, and further generates, based on the linear images, a high dynamic range (HDR) image in which a relationship between luminance and an output pixel value differs depending on a luminance region, under a predetermined imaging mode; a control circuit board that enables a plurality of types of driving-related processes based on the captured images to be performed; a housing that houses the camera module and the control circuit board; a bracket that is a member for fixing the housing to a front windshield of the own vehicle, and in which an opening is formed such that the housing and the front windshield oppose each other in a state in which the housing is fixed to the front windshield by the member; and a hood that is arranged so as to cover the camera module.

According to such a configuration, the on-board camera apparatus generates a plurality of linear images when imaging of the area ahead of the own vehicle is performed. In addition, under a predetermined imaging mode, the on-board camera apparatus further generates an HDR image based on the linear images. Therefore, even when the imaging mode is switched between the mode in which the HDR image is generated and the mode in which the HDR image is not generated, the captured images can be generated without delay. The linear images and the HDR image can be selectively used, thereby improving the accuracy of the driving-related process. As a result, a process can be performed with high accuracy and in real-time based on a captured image of the periphery of the own vehicle.

DESCRIPTION OF THE EMBODIMENTS

Embodiments to which the present disclosure is applied will hereinafter be described with reference to the drawings.

First Embodiment

Description of the Configuration

Figure 1:
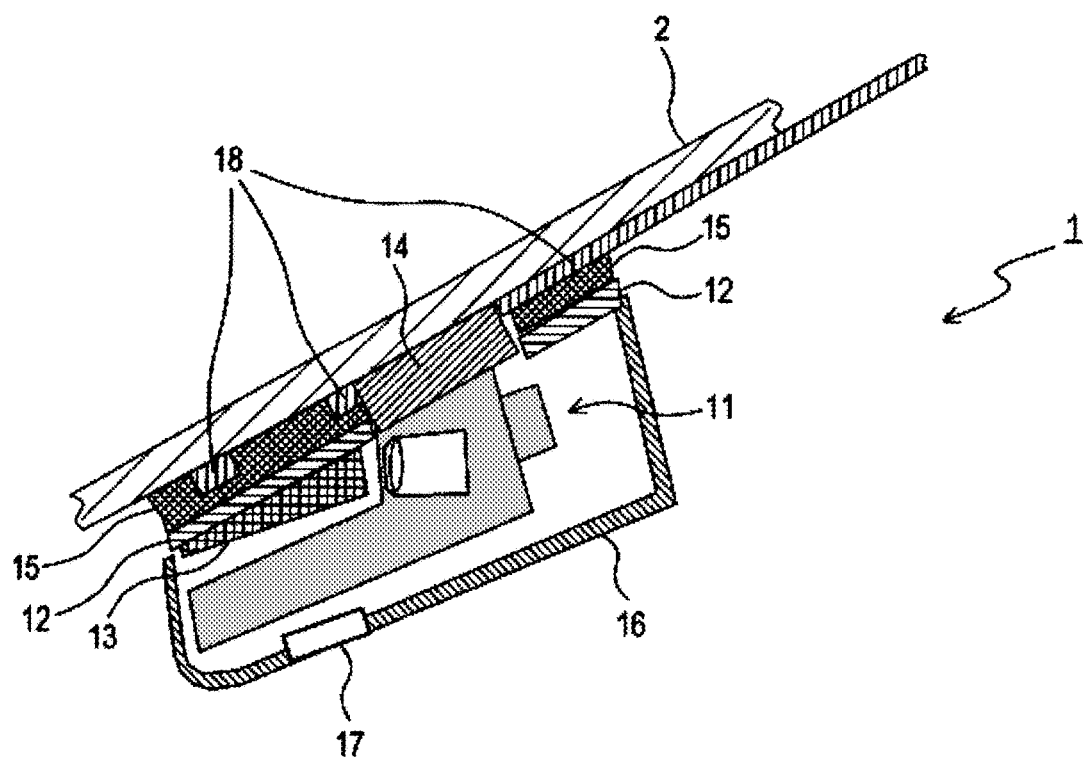
FIG. 1 is a cross-sectional view of a camera apparatus according to a first embodiment.
Figure 2:
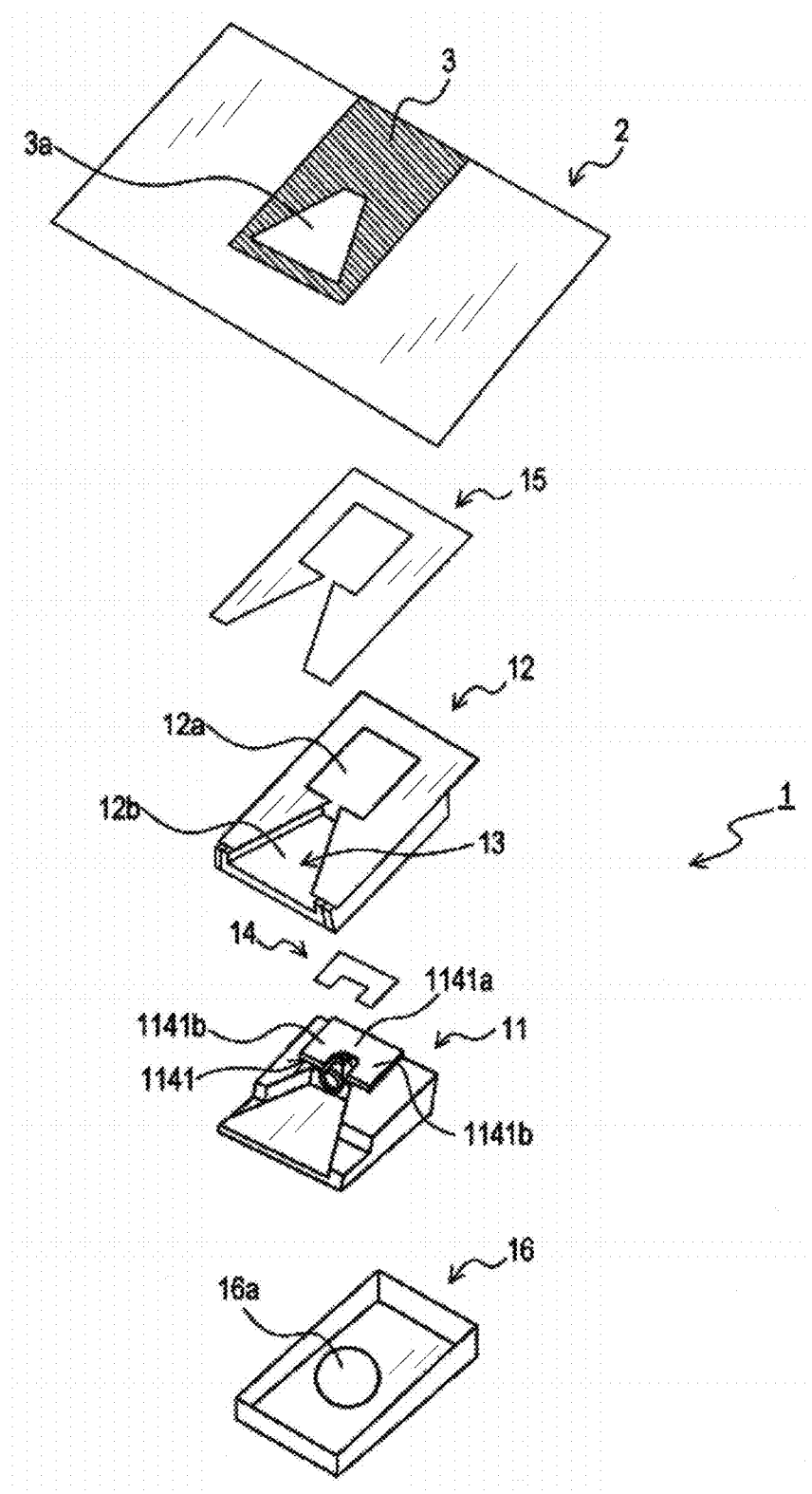
FIG. 2 is an exploded perspective view of the camera apparatus according to the first embodiment.

A camera apparatus 1 shown in FIG. 1 and FIG. 2 is attached to a front windshield 2 of a vehicle on the inner side (vehicle-cabin side). The camera apparatus 1 is set in the center (near the rearview mirror) of an upper portion of the front windshield 2. The camera apparatus 1 includes an image sensor 11, a bracket 12, a hood 13, a first heat conducting member 14, a second heat conducting member 15, a cover 16, a ventilation fan 17, and a hot wire 18. FIG. 1 and FIG. 2 show a portion of the front windshield 2. For convenience of description, the ventilation fan 17 and the hot wire 18, shown in FIG. 1, are omitted in FIG. 2. The vehicle to which the camera apparatus 1 is mounted is referred to, hereafter, as an own vehicle.

Figure 3:
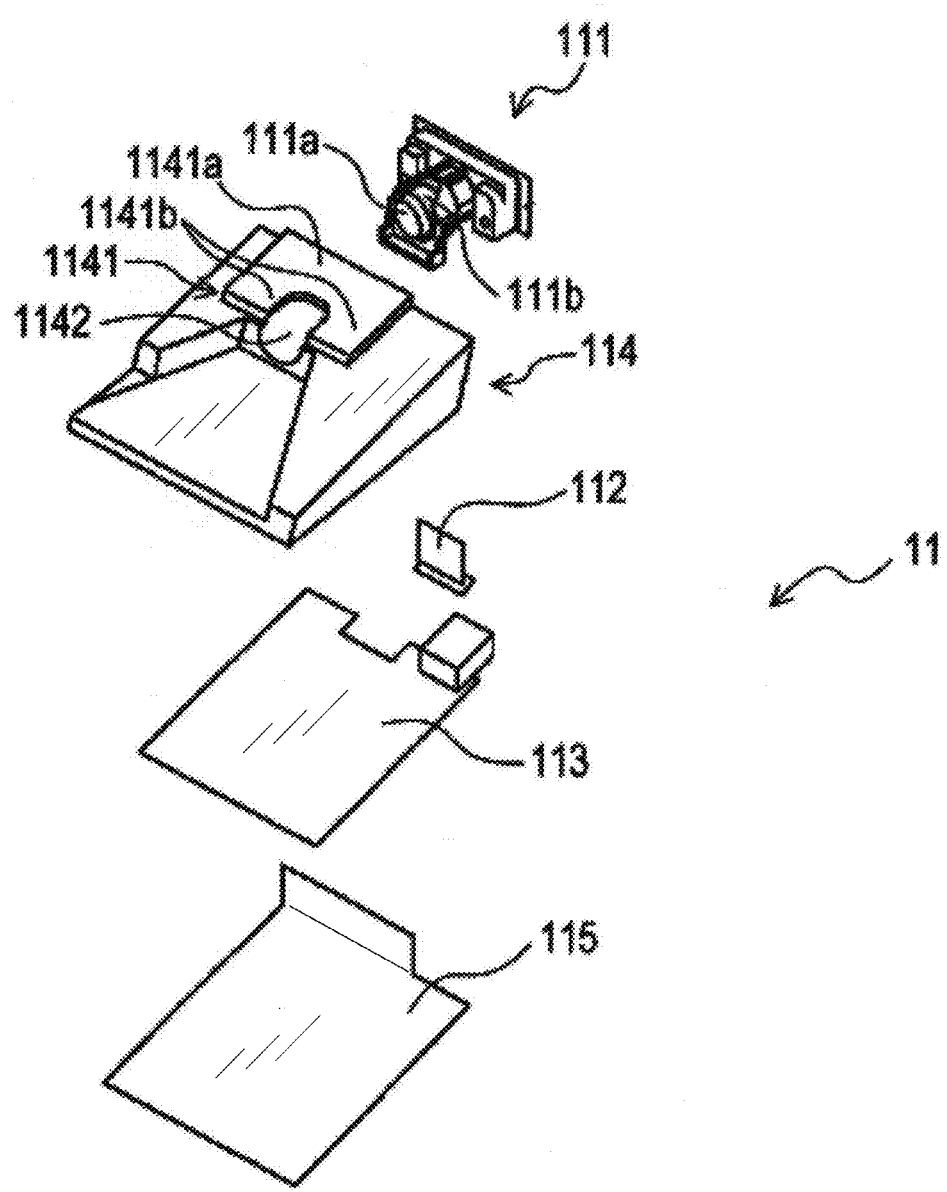
FIG. 3 is an exploded perspective view of an image sensor according to the first embodiment.

As shown in FIG. 3, the image sensor 11 includes a camera module 111, electrical connection wiring 112, a control circuit board 113, a housing 114, and a lower cover 115.

The camera module 111 is a device used to capture an image of a scene ahead of the own vehicle, or to the sides of the vehicle towards the front. The camera module 111 includes a lens 111a, a lens barrel portion 111b, and an image sensor (not shown). The image sensor is disposed on an optical axis of the lens 111a inside the lens barrel portion 111b. The lens barrel portion 111b is a circular cylindrical section that holds therein the lens 111a. The image sensor is composed of a known array-type image sensor and a red, blue, green, and cyan (RGBC) Bayer filter.

In the array-type image sensor, light-receiving elements for acquiring an optical image are disposed in an array. The light-receiving element is, for example, a complementary metal-oxide-semiconductor (CMOS) sensor or a chargecoupled device (CCD) sensor. The RGBC Bayer filter is a set of optical filters of a plurality of types, each having a different passband. The image sensor is configured such that each light-receiving element receives incident light through any one of the optical filters configuring the RGBC Bayer filter. The wavelength band of light received by the light-receiving element is such that sensitivity to at least wavelengths corresponding to visible light is imparted.

The electrical connection wiring 112 is a component (such as a flexible printed board) used to electrically connect the camera module 111 and the control circuit board 113.

The control circuit board 113 is a plate-shaped component that includes a known microcomputer. The microcomputer is mainly composed of a central processing unit (CPU), a read-only memory (ROM), and a random access memory (RAM).

The housing 114 is a container-like member that is open on the bottom, and has side walls and a top wall. The housing 114 houses the camera module 111, the electrical connection wiring 112, and the control circuit board 113 so as to cover these components from above. In addition, a notch portion 1142 is formed in a windshield-side wall portion 1141 of the housing 114. The notch portion 1142 is provided to enable the lens barrel portion 111b of the camera module 111 to be exposed on the front windshield 2 side. Here, the windshield-side wall portion 1141 is a portion of the top wall of the housing 114 that is positioned further towards the front windshield 2 side than the camera module 111 inside the housing 114, in a state in which the housing 114 is fixed to the front windshield 2 by the bracket 12, by a method described hereafter.

The lower cover 115 is a member used to close the bottom of the housing 114.

The bracket 12 shown in FIG. 1 and FIG. 2 is a substantially plate-shaped member composed of resin. In a center portion of the bracket 12, an opening portion 12a is formed, and in an area of the bracket 12 surrounding the opening portion 12a, a notched portion 12b is formed such that the bracket 12 is formed into a U-shape. The bracket 12 is used to fix the housing 114 of the image sensor 11 to the front windshield 2. That is, a surface of the bracket 12 that is one of two faces perpendicular to the thickness direction is fixed (in this example, adhered) to the front windshield 2.

The housing 114 is assembled to the fixed bracket 12, thereby fixing the housing 114 to the front windshield 2. In a state in which the housing 114 is fixed to the front windshield 2 by the bracket 12 in this way, the housing 114 and the front windshield 2 oppose each other as a result of the opening portion 12a being formed in the bracket 12. The term "oppose" herein refers to the housing 114 and the front windshield 2 facing each other without any components therebetween. In addition, the notched portion 12b of the bracket 12 is positioned in front of the camera module 111 that is exposed from the housing 114. The notched portion 12b is formed into a trapezoidal shape of which the width widens towards the front side in the imaging direction of the camera module 111, so as to correspond to the angle-of-view range of the camera module 111. The field of view of the camera module 111 is thereby ensured.

The hood 13 is a member that is composed of resin. The hood 13 has a trapezoidal bottom surface and two side surfaces that are erected on two sides of the trapezoidal bottom surface other than the base side. The hood 13 is used so as to be fitted into the notched portion 12b of the bracket 12.

According to the present embodiment, the housing 114 is assembled to the bracket 12 into which the hood 13 has been fitted. As a result, the configuration is such that the hood 13 covers the lens barrel portion 111b of the camera module 111. Here, the hood 13 is arranged such that the bottom surface of the hood 13 is positioned below the lens barrel portion 111b of the camera module 111. As a result of the hood 13 being arranged in this way, the lens 111a can be suppressed from capturing scenery outside of the angle-of-view range of the camera module 111.

The first heat conducting member 14 is a silicon-based sheet member having a coefficient of thermal conductivity of 1 [W/m·K] or more and 50 [W/m·K] or less. The first heat conducting member 14 has tackiness and an adhesive property. That is, the first heat conducting member 14 adheres to an object to which the first heat conducting member 14 has come into contact. The first heat conducting member 14 is provided so as to come into contact with the housing 114 and the front windshield 2 in the opening portion 12a formed in the bracket 12.

According to the present embodiment, first, the first heat conducting member 14 is attached by adhesion to the windshield-side wall portion 1141 of the housing 114. Then, the housing 114 is fixed to the front windshield 2 by the bracket 12. As a result, the first heat conducting member 14 comes into close contact with the front windshield 2 and adhered thereto. Here, the size and shape of the first heat conducting member 14 are similar to those of the top surface of the windshield-side wall portion 1141 of the housing 114. Therefore, the first heat conducting member 14 is in contact with an area 1141a that is positioned further towards the rear side in the imaging direction of the camera module 111 than the notched portion 1142 of the windshield-side wall portion 1141. In addition, the first heat conducting member 14 is also in contact with areas 1141b of the windshield-side wall portion 1141 that sandwich the notched portion 1142 on both sides.

The second heat conducting member 15 is a sheet member that is composed of the same material as the first heat conducting member 14. The second heat conducting member 15 is positioned between the bracket 12 and the front windshield 2, and provided so as to be in contact with the bracket 12 and the front windshield 2. According to the present embodiment, the shape and size of the second heat conducting member 15 are similar to those of the top surface of the bracket 12. The second heat conducting member 15 is adhered to the overall top surface of the bracket 12. The second heat conducting member 15 is fixed to the bracket 12 and the front windshield 2 through use of an adhesive.

According to the present embodiment, the second heat conducting member 15 is attached to the front windshield 2 with a black ceramic component 3 therebetween to suppress visibility of the adhesive or the like used to fix the second heat conducting member 15 to the front windshield 2, from outside of the own vehicle. Here, a trapezoidal notched portion 3a is formed in the black ceramic component 3 so as not to block the field of view of the camera module 111. The trapezoidal shape of the notched portion 3a corresponds to the angle-of-view range of the camera module 111.

The cover 16 is a container-like member that is open on the top, and has side surfaces and a bottom surface. The cover 16 covers the image sensor 11, the bracket 12, and the hood 13 from below. The cover 16 serves to make these components less visible from inside the vehicle cabin of the own vehicle. According to the present embodiment, a through hole 16a is formed on the bottom surface of the cover 16.

The ventilation fan 17 is an apparatus for exchanging air present inside the cover 16. The ventilation fan 17 is fixed to the cover 16 so as to be fitted into the through hole 16a formed in the cover 16.

The hot wire 18 heats a portion of the front windshield 2 that is positioned to the front of the lens 11a of the camera module 111. According to the present embodiment, the hot wire 18 is a copper wire. Both ends of the hot wire 18 are connected to a power supply (not shown) disposed in the own vehicle. The hot wire 18 generates heat through conduction.

A detailed structure of the image sensor is disclosed in prior art literature, such as Japanese Patent Application Nos. 2013-199973, 2014-215644, and 2014-260494.

Figure 4:
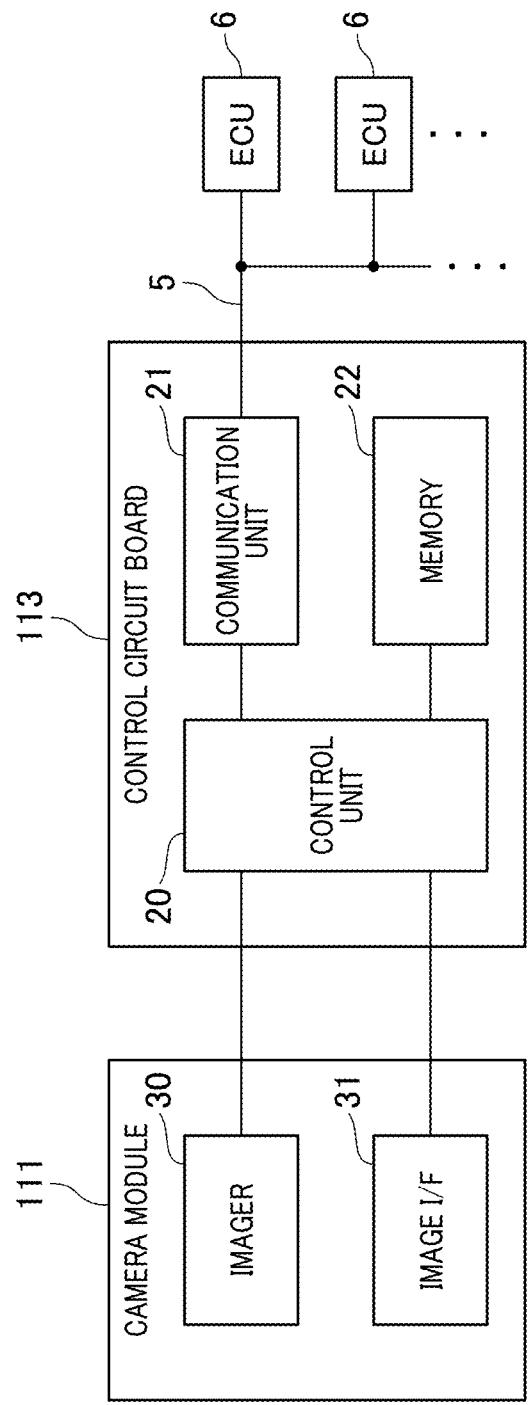
FIG. 4 is a block diagram of a camera module and a control circuit board according to the first embodiment.

Next, an electrical configuration of the camera module 111 and the control circuit board 113 will be described (FIG. 4).

The camera module 111 includes an imager 30, an image I/F 31, and the like.

The imager 30 includes the above-described image sensor, an amplifying unit, an analog-to-digital (A/D) converting unit, an image processing unit, and the like.

When the image sensor captures an image, the amplifying unit amplifies an analog signal (image signal) with a predetermined gain. The analog signal indicates luminance (brightness) of a pixel in the captured image outputted from the image sensor. In addition, the A/D converting unit converts an analog value indicating the amplified image signal to a digital value (an output pixel value of a pixel configuring the captured image). As a result, a linear image is generated. The linear image is a captured image in which a relationship between luminance and the output pixel value is fixed (i.e., linear) for all luminance regions. In the linear image, the relationship between luminance and the output pixel value is expressed by a linear function that is shared among all luminance regions.

In addition, the image processing unit combines a plurality of linear images, thereby generating a high dynamic range (HDR) image that is a captured image having an expanded dynamic range. In the HDR image, the relationship between luminance and the output pixel value differs depending on the luminance region.

Figure 5:
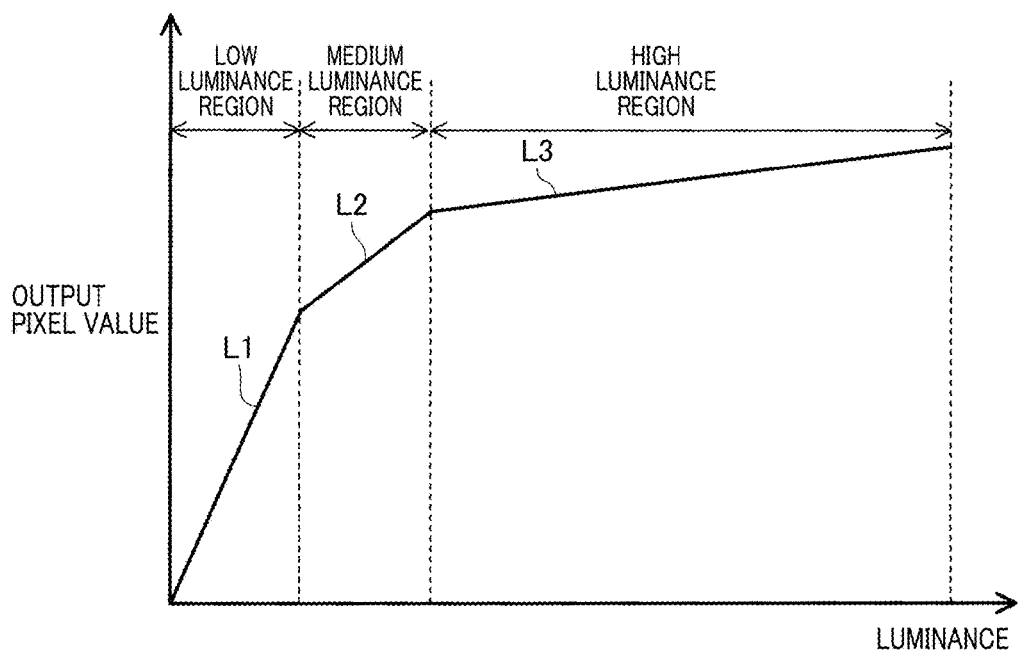
FIG. 5 is an explanatory diagram of characteristics of an HDR image.

FIG. 5 shows the relationship between luminance and the output pixel value in the HDR image. The relationship is expressed by a polygonal line having a plurality of straight line segments that have slopes (or inclinations or gradients) that differ among a low luminance region, a medium luminance region, and a high luminance region (i.e., a graph combining three types of straight line segments L1, L2, and L3 having different slopes among these three regions). Among these three regions, resolution in the low luminance region is the finest, whereas resolution in the high luminance region is the coarsest. As a result, output of a wide luminance range becomes possible. The relationship between luminance and the output pixel value shown in FIG. 5 is an example in the present embodiment. For example, the relationship may be expressed by a graph that combines two types or four or more types of straight line segments having different slopes. Alternatively, the relationship may be expressed by logarithm characteristics (curved line).

In the camera module 111, exposure is performed an X-number of times (such as three times) at a single imaging timing. The imager 30 generates linear images having differing luminance resolutions, based on the analog signals outputted from the camera module 111 at the respective exposures. That is, the imager 30 generates an X-number of linear images having differing luminance resolutions at the single imaging timing.

In addition, the imager 30 is provided with linear mode and HDR mode. In linear mode, the imager 30 generates the above-described X-number of linear images at each imaging timing. Meanwhile, in HDR mode, the imager 30 generates the X-number of linear images and also generates an HDR image obtained by combining these linear images.

The image I/F 31 outputs the image data of the captured images generated by the imager 30 to the control circuit board 113.

The control circuit board 113 includes a control unit 20, a communication unit 21, a memory 22, and the like.

The control unit 20 is mainly configured by a known microcomputer. The microcomputer includes a CPU, a ROM, a RAM, a bus line that connects these components, and the like. The control unit 20 performs integrated control of the camera apparatus 1 based on a program stored in the ROM.

The communication unit 21 performs communication with another electronic control unit (ECU) 6 mounted in the own vehicle, via an on-board local area network (LAN) 5, such as a controller area network (CAN).

The memory 22 is a section that stores therein image data of the images captured by the camera module 111 and the like. The memory 22 is composed of a RAM or the like.

Processes

The camera apparatus 1 according to the first embodiment captures images of the area ahead of the own vehicle with the camera module 111, at an imaging timing that periodically arrives. Then, based on the captured images, the control circuit board 113 or the other ECU 6 performs a plurality of types of driving-related processes. In each type of the driving-related process, image recognition of the captured images is performed, and then, based on the result of image recognition, a process related to driving of the own vehicle is performed. As examples of types of the driving-related processes, a driving assistance process, a process for enabling automatic cruising, and the like can be considered. More specifically, for example, a process in which another vehicle, a pedestrian, or the like is detected, and issuing of a warning, vehicle speed control, steering angle control, or the like is performed to avoid collision can be considered. Furthermore, a process in which deviation from a traffic lane is detected, a process in which headlight direction or the like is controlled, and like can be considered.

Figure 6:
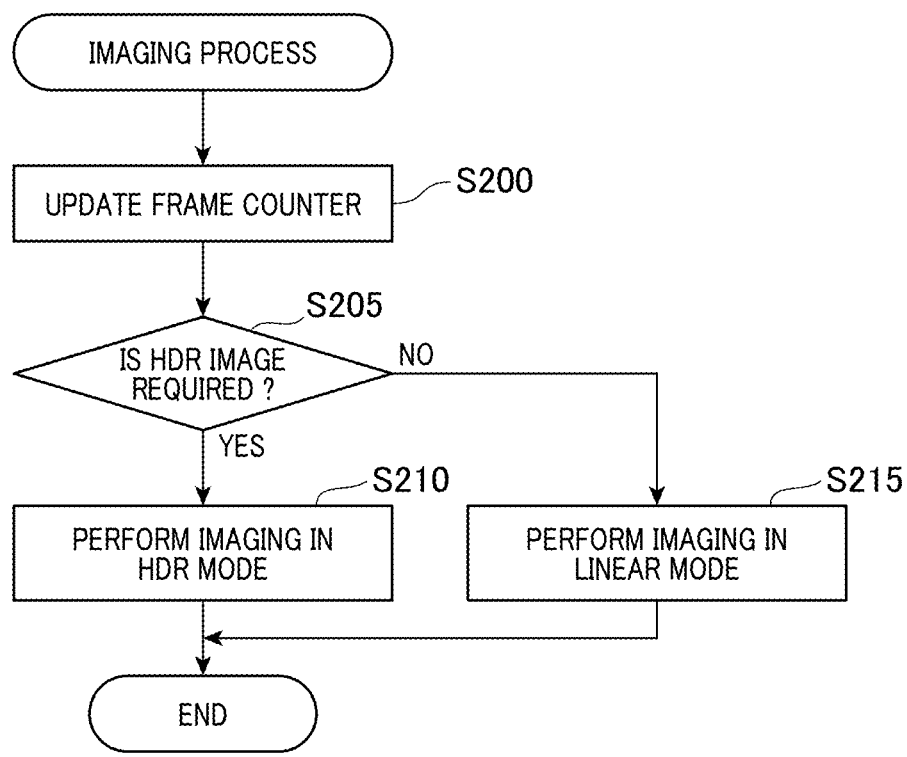
FIG. 6 is a flowchart of an imaging process according to the first embodiment.
Figure 7:
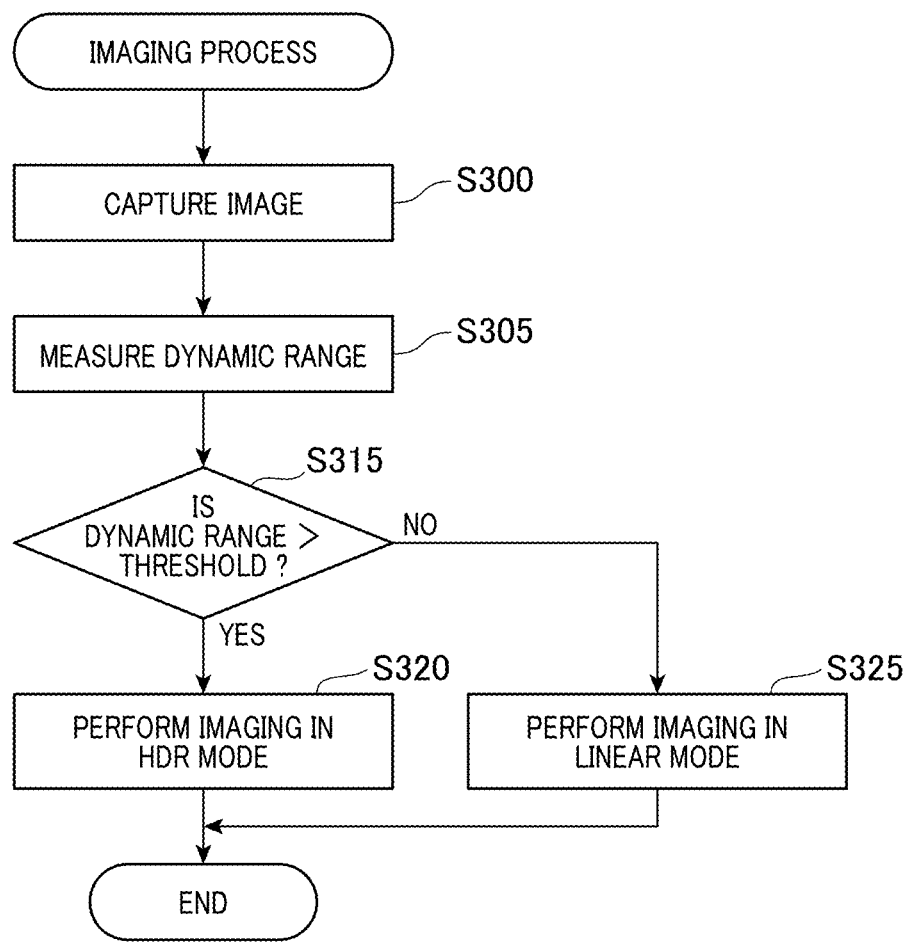
FIG. 7 is a flowchart of an imaging process according to a second embodiment.

In addition, either of the linear images and the HDR image is used in the driving-related processes, depending on the content of the process. Hereafter, an imaging process in which images of the area ahead of the own vehicle are captured upon arrival of the periodic imaging timing, and the captured images to be used in the driving-related process are generated will be described (FIG. 6).

At step S200, the control unit 20 of the control circuit board 113 in the camera apparatus 1 updates a frame counter and proceeds to step S205. The frame counter indicates the driving-related process in which the captured images are to be used. For example, the frame counter cyclically changes between 0 to n (n being an integer of 1 or more). The numbers of the frame counter are respectively associated with the driving-related processes.

At step S205, the control unit 20 determines whether or not the driving-related process corresponding to the value of the updated frame counter is a process that requires the HDR image. When determined Yes at step S205, the control unit 20 proceeds to step S210. When determined No at step S205, the control unit 20 proceeds to step S215.

At S210, the control unit 20 performs imaging with the camera module 111 in HDR mode and generates the HDR image. The control unit 20 then enables the driving-related process based on the HDR image to be performed. The control unit 20 ends the present process. Specifically, for example, when the control circuit board 113 performs the driving-related process, the control unit 20 may supply the HDR image to the section performing the driving-related process, and make the section start the driving-related process. In addition, for example, when the other ECU 6 performs the driving-related process, the control unit 20 may transmit the HDR image to the ECU 6 via the on-board LAN 5, and make the ECU 6 perform the driving-related process.

At step S215, the control unit 20 performs imaging with the camera module 111 in linear mode, and generates the linear images. The control unit 20 then enables the driving-related process based on the linear images to be performed, in a manner similar to that at step S210. The control unit 20 ends the present process.

As the driving-related process performed based on the HDR image, for example, a process accompanying a process in which image recognition of an illumination state of a lamp on a leading vehicle is performed from a captured image, may be considered. In addition, as the driving-related process performed based on the linear image, for example, a process accompanying a process in which image recognition of a white line, a pedestrian, a vehicle, or the like is performed from a captured image, may be considered Effects In a camera apparatus, when a delay in generation of a captured image occurs when switching is performed between linear mode and HDR mode, real-timeness of the driving-related process may be compromised.

In this regard, the camera apparatus 1 according to the first embodiment generates the X-number of linear images at the imaging timing that periodically arrives. In HDR mode, the camera apparatus 1 further generates the HDR image based on the linear images. Therefore, even when imaging mode is switched, the linear images or the HDR image can be generated without delay. Real-timeness of the driving-related process is not compromised. In addition, these captured images can be selectively used, and accuracy of the driving-related process can be improved. Therefore, a driving-related process can be performed with high accuracy and in real-time, based on a captured image of the periphery of the own vehicle.

In addition, the driving-related processes are, for example, a process in which another vehicle, a pedestrian, or the like is detected, and issuing of a warning, vehicle speed control, steering angle control, or the like is performed to avoid collision; a process in which deviation from a traffic lane is detected; and a process in which headlight direction or the like is controlled. Therefore, these processes can be performed with high accuracy and in real-time.

In addition, the imaging mode of the camera apparatus 1 is switched between linear mode in which only the linear images are generated and HDR mode in which the linear images and the HDR image are generated, depending on the content of the driving-related process. Therefore, the driving-related process can be performed using the appropriate captured image. The driving-related process can be performed with high accuracy.

Second Embodiment

Next, the camera apparatus 1 according to a second embodiment will be described. The camera apparatus 1 according to the second embodiment is configured in a manner similar to that according to the first embodiment. However, the content of the imaging process differs in part. The difference will mainly be described below.

Specifically, according to the first embodiment, the camera apparatus 1 performs imaging in the imaging mode based on the driving-related process to be performed next. The camera apparatus 1 then generates the captured image suitable for the driving-related process. Conversely, according to the second embodiment, the camera apparatus 1 performs imaging in an imaging mode based on a level difference in brightness in the area ahead of the own vehicle, and generates a captured image. The imaging process according to the second embodiment will be described below.

At step S300, the control unit 20 of the control circuit board 113 in the camera apparatus 1 perform imaging of the area ahead of the own vehicle with the camera module 111 and generates a linear image. The control unit 20 then measures a dynamic range (a ratio of a minimum value and a maximum value of image signals from the image sensor) of the linear image based on the output pixel values (step S305) and proceeds to step S310.

At step S315, the control unit 20 determines whether or not the dynamic range exceeds a predetermined threshold (whether or not the level difference in brightness in the area ahead of the own vehicle is large). When determined Yes at step S315, the control unit 20 proceeds to step S320. When determined No at step S315, the control unit 20 proceeds to step S325.

At step S320, the control unit 20 performs imaging with the camera module 111 in HDR mode, in a manner similar to that at step S210 in the imaging process according to the first embodiment. The control unit 20 then enables the driving-related process based on the HDR image to be performed, and ends the present process.

Meanwhile, at step S325, the control unit performs imaging with the camera module 111 in linear mode, in a manner similar to that at step S215 in the imaging process according to the first embodiment. The control unit 20 then enables the driving-related process based on the linear images to be performed, and ends the present process.

Effects

When the level difference in brightness in the area ahead of the own vehicle is large, the imaging mode of the camera apparatus 1 according to the second embodiment is HDR mode in which the linear images and the HDR image are generated. Therefore, the driving-related process being performed based on a captured image of which gradation is deteriorated can be prevented. The driving-related process can be performed with high accuracy.

Other Embodiments

Embodiments of the present disclosure are described above. However, the present disclosure is not limited to the above-described embodiments. Various other embodiments are possible.

(1) In the camera apparatus 1 according to the first and second embodiments, imaging is performed at a periodic imaging timing. However, the present disclosure is not limited thereto. Imaging may be performed at various timings (for example, at a timing requested in a driving-related process). Similar effects can be achieved even in such cases.

(2) In the camera apparatus 1 according to the first embodiment, the imaging mode is switched between linear mode and HDR mode depending on the content of the driving-related process. In the camera apparatus 1 according to the second embodiment, the imaging mode is switched between linear mode and HDR mode based on the level difference in brightness in the area ahead of the own vehicle. However, the present disclosure is not limited thereto. The imaging mode may be switched between linear mode and HDR mode based on various factors. Similar effects can be achieved even in such cases.

(3) The camera apparatus 1 according to the first and second embodiments is attached to the front windshield 2 of the own vehicle. However, the attachment position is not limited to the front windshield 2. For example, the camera apparatus 1 may be attached to a rear windshield, a side window, or the like of the own vehicle using a similar configuration. Similar effects can be achieved even in such cases.

(4) A function provided by a single constituent element according to the first or second embodiment may be dispersed among a plurality of constituent elements. Functions provided by a plurality of constituent elements may be integrated in a single constituent element. In addition, at least a part of a configuration according to the first or second embodiment may be replaced with a publicly known configuration providing a similar function. Furthermore, a part of a configuration according to the first or second embodiment may be omitted. Moreover, at least a part of a configuration according to the first or second embodiment may be added to or replace another configuration according to the first or second embodiment. Any embodiment included in the technical concept specified by the wordings in the claims is an embodiment of the present disclosure.

(5) The present disclosure can also be actualized by various modes in addition to the above-described camera apparatus 1, such as a system of which the camera apparatus 1 is a constituent element, a program enabling a computer to function as the camera apparatus 1, a recording medium on which the program is recorded, and a method corresponding to the imaging processes according to the first and second embodiments.

Correspondence to the Claims

Correspondence between the terms used in the description of the first and second embodiments and the terms used in the claims will be indicated.

Step S305 in the imaging process according to the second embodiment which corresponds to an example of detecting means.

What is claimed is:

1. An on-board camera apparatus comprising:
   a camera module that captures an image of an area ahead of an own vehicle, generates, as captured images, a plurality of linear images in which a relationship between luminance and an output pixel value is fixed, and further generates, based on the linear images, high dynamic range images in which a relationship between luminance and an output pixel value differs depending on a luminance region, under a predetermined imaging mode, the high dynamic range images being used for image recognition of an illumination state of a lamp on a preceding vehicle, the linear images being used for image recognition of a pedestrian, another vehicle, or a white line;
   a control circuit board that enables a plurality of types of driving-related processes based on the captured images to be performed, and enables the camera module to perform either of a linear mode and a high dynamic range mode in a setting in which a plurality of images are captured at a plurality of exposures that are performed at a single imaging timing, the linear mode being a mode in which the linear images are generated without combining the plurality of captured images, the high dynamic range mode being a mode in which the high dynamic range images are generated by combining the plurality of captured images;
   a housing that houses the camera module and the control circuit board;
   a bracket that is a member for fixing the housing to a front windshield of the own vehicle, and in which an opening is formed such that the housing and the front windshield oppose each other in a state in which the housing is fixed to the front windshield by the member; and
   a hood that is arranged so as to cover the camera module.

2. The on-board camera apparatus according to claim 1, wherein:
   the control circuit board enables, as the types of driving-related processes, at least one of a process for detecting deviation of the own vehicle from a traffic lane, a process for controlling headlights of the own vehicle, and a process for avoiding collision of the own vehicle to be performed.

3. The on-board camera apparatus according to claim 1, wherein:
   the control circuit board enables a first type of the types of driving-related processes to be performed based on the linear images and enables a second type of the types of driving-related processes to be performed based on the high dynamic range images.

4. The on-board camera apparatus according to claim 1, wherein:
   the control circuit board detects a level difference in brightness in the area ahead of the own vehicle; and
   the control circuit board selects either of the linear images and the high dynamic range images based on the detected level difference in brightness, and enables the driving-related process to be performed based on the selected image.

5. The on-board camera apparatus according to claim 1, wherein:
   the control circuit board enables the camera module to generate the captured images at a timing that periodically arrives, and enables the types of driving-related processes to be performed based on the captured images.

6. The on-board camera apparatus according to claim 2, wherein:
   the control circuit board enables a first type of the types of driving-related processes to be performed based on the linear images and enables a second type of the types of driving-related processes to be performed based on the high dynamic range images.

7. The on-board camera apparatus according to claim 2, wherein:
   the control circuit board detects a level difference in brightness in the area ahead of the own vehicle; and the control circuit board selects either of the linear images and the high dynamic range images based on the detected level difference in brightness, and enables the driving-related process to be performed based on the selected image.

8. The on-board camera apparatus according to claim 2, wherein:
the control circuit board enables the camera module to generate the captured images at a timing that periodically arrives, and enables the types of driving-related processes to be performed based on the captured images.

9. The on-board camera apparatus according to claim 3, wherein:
the control circuit board enables the camera module to generate the captured images at a timing that periodically arrives, and enables the types of driving-related processes to be performed based on the captured images.

10. The on-board camera apparatus according to claim 4, wherein:
the control circuit board enables the camera module to generate the captured images at a timing that periodically arrives, and enables the types of driving-related processes to be performed based on the captured images.

11. A control method for an on-board camera apparatus, the on-board camera apparatus comprising: a camera module; a control circuit board; a housing that houses the camera module and the control circuit board; a bracket that is a member for fixing the housing to a front windshield of the own vehicle, and in which an opening is formed such that the housing and the front windshield oppose each other in a state in which the housing is fixed to the front windshield by the member; and a hood that is arranged so as to cover the camera module, the control method comprising:
capturing, by the camera module, an image of an area ahead of an own vehicle, generating, as captured images, a plurality of linear images in which a relationship between luminance and an output pixel value is fixed, and further generating, based on the linear images, high dynamic range images in which a relationship between luminance and an output pixel value differs depending on a luminance region, under a predetermined imaging mode, the high dynamic range images being used for image recognition of an illumination state of a lamp on a preceding vehicle, the linear images being used for image recognition of a pedestrian, another vehicle, or a white line; and
enabling, by the control circuit board, a plurality of types of driving-related processes based on the captured images to be performed, and enabling the camera module to perform either of a linear mode and a high dynamic range mode in a setting in which a plurality of images are captured at a plurality of exposures that are performed at a single imaging timing, the linear mode being a mode in which the linear images are generated without combining the plurality of captured images, the high dynamic range mode being a mode in which the high dynamic range images are generated by combining the plurality of captured images.

* * * * *